United States Patent [19]

Marwood

[11] Patent Number: 5,398,322
[45] Date of Patent: Mar. 14, 1995

[54] NUMBER THEORY MAPPING GENERATOR FOR ADDRESSING MATRIX STRUCTURES

[75] Inventor: Warren Marwood, Wynn Vale, Australia

[73] Assignee: Luminis Pty. Ltd., Australia

[21] Appl. No.: 958,319

[22] PCT Filed: Jun. 27, 1991

[86] PCT No.: PCT/AU91/00272
§ 371 Date: May 18, 1993
§ 102(e) Date: May 18, 1993

[87] PCT Pub. No.: WO92/00563
PCT Pub. Date: Jan. 9, 1992

[30] Foreign Application Priority Data

Jun. 27, 1990 [AU] Australia .................... PK 0825

[51] Int. Cl.⁶ .......................................... G06F 12/00
[52] U.S. Cl. .................................................. 395/400
[58] Field of Search ............... 395/400, 425, 164, 166

[56] References Cited

U.S. PATENT DOCUMENTS

| | | | |
|---|---|---|---|
| 4,051,551 | 9/1977 | Lawrie et al. | 395/425 |
| 4,370,732 | 1/1983 | Kogge | 395/400 |
| 4,484,265 | 11/1984 | Czekalski | 395/400 |
| 4,563,750 | 1/1986 | Clarke | 364/726 |
| 4,809,156 | 2/1989 | Taber | 395/400 |
| 4,819,152 | 4/1989 | Deerfield et al. | 395/400 |
| 4,959,776 | 9/1990 | Deerfield et al. | 395/400 |
| 5,293,596 | 3/1994 | Toyokura et al. | 395/400 |

FOREIGN PATENT DOCUMENTS 0286260 10/1988 European Pat. Off. .

OTHER PUBLICATIONS

E. O. Nwachukwu "Address Generation in an Array Processor," IEEE Transactions on Computers, vol. C-34, No. 2, Feb. 1985, pp. 170–173.

R. N. Zobel, "Some Alternative Techniques for Hardware Address Generators for Digital Signal Processors," ISCAS, 1988, pp. 69–72.

F. E. Hall and A. G. Rocco, Jr., "A Compact Programmable Array Processor," The Lincoln Laboratory Journal, vol. 2, No. 1, 1989, pp. 41–62.

Primary Examiner—Jack B. Harvey
Assistant Examiner—Michael A. Whitfield
Attorney, Agent, or Firm—Brown, Martin, Haller & McClain

[57] ABSTRACT

The generation of number theory mappings and their application to the addressing of matrix structures through the provision of an address generator which is optimized for the general task of applying "on-the-fly" number theory mappings to matrix operands as they are fetched from memory. The address generator comprises a set of six matrix descriptor storage registers, a finite state machine controller, a first decrementer for cyclically decrementing a first matrix size descriptors from a first of the six storage registers, a second decrementer for cyclically decrementing a second matrix size descriptor from a second of the six storage registers, a finite difference engine which adds one of two matrix difference descriptors to a previously calculated address value obtained from an address register, a modulo arithmetic computation unit which computes the residue of the output of the finite difference engine modulo a matrix modulo descriptor, and an adder which adds an offset value stored as a matrix base descriptor to the output of the modulo arithmetic computation unit. The output sequence from the adder is the desired address generator output.

7 Claims, 1 Drawing Sheet

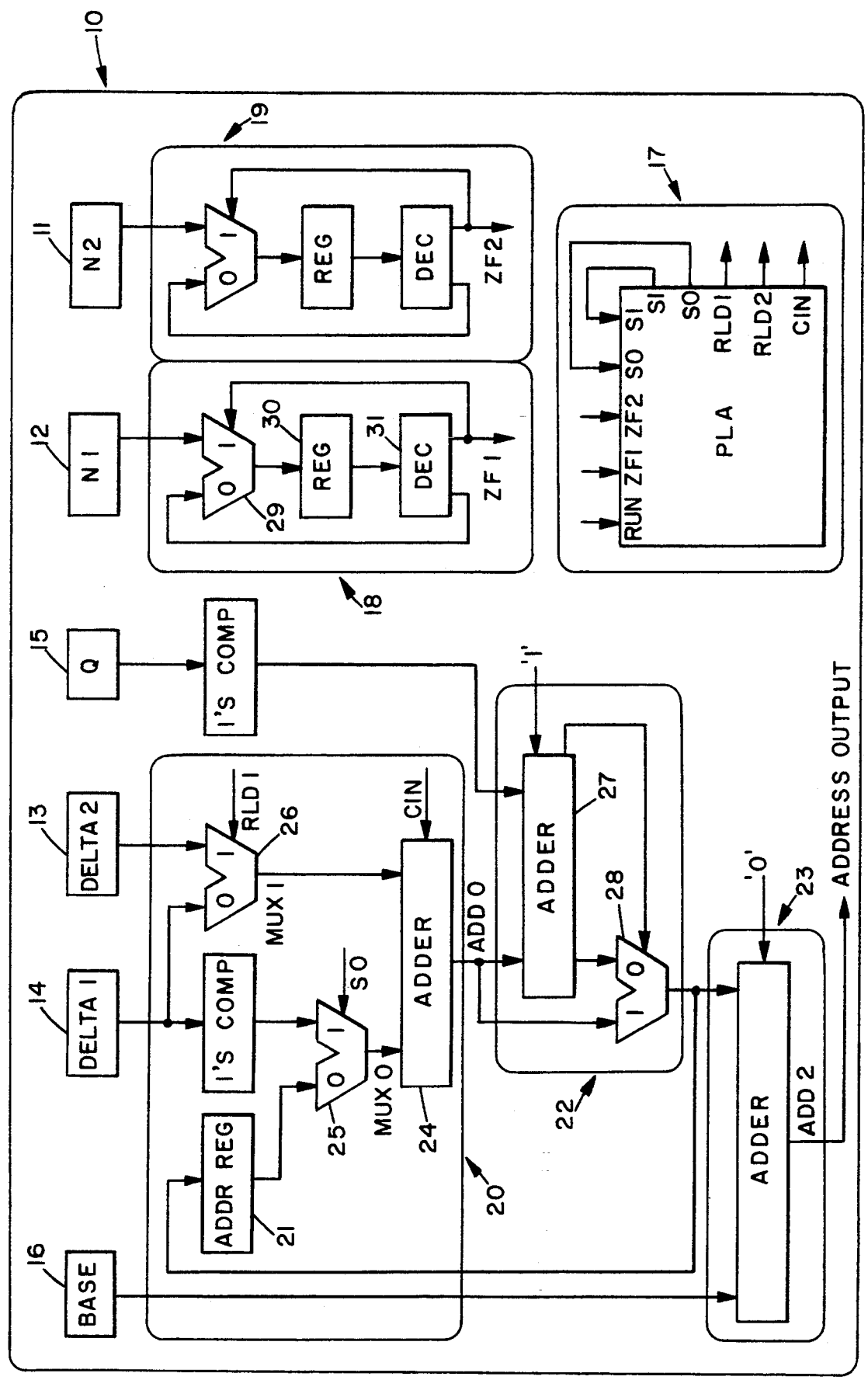

NUMBER THEORY MAPPING GENERATOR FOR ADDRESSING MATRIX STRUCTURES

This invention relates to the generation of number theory mappings and their application to the addressing of matrix structures in computer systems. The invention provides particular advantages when used in computer architectures that include systolic processors.

BACKGROUND OF THE INVENTION

Address generation has been a continuing problem for computers, particularly as operation speeds have increased. As the number and range of applications has expanded, there has arisen a need for address generators to produce a range of non-sequential address sequences. A common example is the bit- reversed addressing for the FFT.

Common Digital Signal Processing (DSP) addressing patterns include:
  Sequential
  Inverted
  Reflected
  Bit-reversed
  Perfect shuffled (Interleaved)
  Multiple shuffled
  Parallel shuffled These patterns are in common usage as a result of the vector nature of the common computer architectures. Reference can be made to the paper by ZOBEL, R. N., "Some alternative techniques for hardware address generators for digital signal processors", ISCAS'88, CH2458-8/88 pp. 69–72, 1988, for a description of hardware which implements these addressing patterns. Another paper which describes a versatile hardware address indexing unit is by NWACHUKWU, E. O., "Address generation in an array processor", IEEE Trans. on Computers, Vol. C-34, No. 2, pp. 170–173, February 1985. A further paper which in part describes a general purpose address generation technique is the paper by HALL, F. E. and ROCCO Jr., A. G., "A compact programmable array processor", The Lincoln Laboratory Journal, Volume 2, Number 1, 1989.

In all of these papers the address generation techniques are designed to optimise vector-based algorithms. Matrices and matrix algorithms are supported as operations upon sets of vectors. These approaches have limitations when matrix algorithms are implemented which can not readily be expressed in terms of sets of vectors. An example of such an algorithm is the one-dimensional Fourier transform implemented with the prime factor algorithm.

The object of this invention is the provision of an address generator which is optimised for general matrix algorithms and which is capable of applying 'on-the-fly' number theory mappings to matrix operands as they are fetched from memory.

MAPPING GENERATOR ARCHITECTURE

A conventional approach to the problem of addressing matrices stored in a linear memory space is to consider addressing the elements of the matrix in terms of strides. The strides specify the linear distance between successive elements of rows or columns respectively. The problem with this approach is that it is not possible to both fetch matrix operands and simultaneously apply general number theory mappings. The mappings must be applied to the matrices as separate operations. These operations must be done in software in a conventional machine and incur significant time penalties.

Examination of conventional matrix storage schemes shows that they can be considered as simple mappings between one-dimensional and multi-dimensional subspaces. Address generation for the matrices can therefore be performed by carrying out a particular mapping from one dimension to or from two or more dimensions. This can be provided by constructing a hardware implementation of a general number theory mapping. The hardware must provide a general capability to support mappings from one dimension to multi-dimensional subspaces.

The solution to the problem is therefore to replace the conventional address generator with a hardware architecture which implements a general number theory mapping, which unlike prior software for the implementation of particular linear transform algorithms is generally applicable to a range of problems which includes but is not limited to linear transforms.

SUMMARY OF THE INVENTION

In its broadest from the invention is an address generator to generate at its output, output addresses of elements of an N-dimensional matrix comprising
  storage means for storing at least four descriptors representative of a matrix structure, wherein,
  at least two size descriptors representative of the size of two dimensions of an n-dimensional matrix and
  at least a further two of said descriptors are difference descriptors representative of the values of two finite address differences,
  a counter means per size descriptor,
  a sequential N-dimensional finite difference calculation means having as input said difference descriptors and an initially zero previously calculated output address from the address generator whereby said counter means controls the finite difference used by the calculation means to calculate a calculation means output address which is also the address generator output address of an element of an N-dimensional matrix.

In a further aspect of the invention the address generator further comprises the use of a modulo descriptor representative of an address value which is greater than all matrix element addresses,
  subtraction means for subtraction from said calculation means output address said modulo descriptor to produce a modulo subtraction means result and a subtraction means sign output,
  selection means to select as the output of said address generator either of the calculation means output address or the subtraction means output address according to the subtraction means sign output.

BRIEF DESCRIPTION OF THE DRAWINGS

FIG. 1 depicts a schematic representation of a preferred number theory mapping address generator.

DETAILED DESCRIPTION OF THE DRAWINGS

The mapping which has been chosen for description by embodiment is known as the alternate integer representation. It has been used to implement a generalised p-dimensional factorization of the T-transform.

Mappings which have also been considered include the Alternate Integer Representation, the Chinese Remainder Theorem and other simple mappings.

From one dimension n to two dimensions ($n_1$, $n_2$), the mappings are:

The Alternate Integer Representation is $$n = (n_1 N_2 + n_2 N_1)_n \quad (1)$$

where $N_1$ and $N_2$ are mutually prime and $N_1 N_2 = N$ and where $n_1 = 0, 1, \ldots, N_1 - 1$ and $n_2 = 0, 1, \ldots, N_2 - 1$.

The Chinese Remainder Theorem is $$n = [n_1 N_2 (N_2^{-1})_{N_1} + n_2 N_1 (N_1^{-1})_{N_2}]_N \quad (2)$$

where $N_1$ and $N_2$ are mutually prime, $N_1 N_2 = N$ and $(a)_N (a^{-1})_N = 1$.

The notation $(a)_N$ means that a is evaluated modulo N.

The Simple Mapping used conventionally to store matricies in linear memory is $$n = n_1 N_2 + n_2 \quad (3)$$

Examination of equations (1) to (3) shows that each can be implemented with a second order difference engine implemented with a modulo arithmetic capability as described in the following embodiment and mapping examples, provided that the constants are chosen appropriately. Consider the following expression:

$$n = \text{base\_address} + (n_1 \Delta 1 + n_2 \Delta 2)_q \quad (4)$$

This maps an element n of an arbitrary matrix [A] stored in a linear address space starting at base\_address onto the ($n_1$, $n_2$) element of a two-dimensional address space. $(.)_q$ normally requires a division operation. However, by performing a conditional subtraction of q during each calculation the modulo arithmetic can be performed without the complexity of multiplication or division.

To address sequentially all elements of the matrix [A] in some order determined by the constants $\Delta 1$, $\Delta 2$ and q, $n_1$ and $n_2$ are indexed through their respective ranges (the dimension of the matrix). Some of the choices for these constants are given in table 1, and the associated mapping is identified.

TABLE 1

| Mapping | $\Delta 1$ | $\Delta 2$ | q |
|---|---|---|---|
| Chinese Remainder Theorem | $N_2(N_2^{-1})_{N_1}$ | $N_1(N_1^{-1})_{N_2}$ | $N_1 N_2$ |
| Alternate Index Representation | $N_2$ | $N_1$ | $N_1 N_2$ |
| Simple(1) | $N_2$ | $N_1$ | max\_int |
| Simple(2) | $N_2$ | 1 | max\_int |
| Simple(3) | 1 | $N_1$ | max\_int |
| Simple(4) | 1 | K | max\_int |

Table 1: Values for $\Delta 1$, $\Delta 2$ and q which implement three different mappings from a one-dimensional to a two-dimensional space.

where max\_int is the maximum integer of the number representation used. This removes the use of modulo arithmetic. It must be noted that the mappings are not restricted to one-to-one for some parameters.

Some matrix types for which this addressing technique provides access include
 Dense matrices
 Diagonal matrices
 Circulant matrices (e.g. the unit matrix)
 Constant matrices
 Number Theory mapped matrices

MAPPING GENERATOR IMPLEMENTATION

FIG. 1 shows a block schematic of a circuit which implements the difference engine of equation (4). 'C' code which simulates the generator is given in Table 3. The address generator assumes a two-phase implementation using a Programmable Logic Array (PLA) to generate the necessary control signals.

The address generator 10 of FIG. 1 comprises in this embodiment a set of six matrix descriptor storage registers 11–16, a finite state machine controller 17, a decrementer 18 for cyclically decrementing a matrix size descriptor 12, an additional decrementer 19 for cyclicly decrementing the matrix size descriptor 11, a finite difference engine 20 which adds one of two matrix difference descriptors 13 or 14 to a previously calculated address value obtained from the address register 21, a modulo arithmetic computation unit 22 which computes the residue of the finite difference engine output 20 modulo the matrix modulo descriptor 15 and an adder 23 which adds an offset value stored as the matrix base descriptor 16 to the output of the modulo arithmetic computation unit 22. The output sequence from the base adder 23 is the desired address generator output.

The finite difference engine 20 has inputs from matrix difference descriptors 13 and 14 which represent difference values which are to be conditionally added to the contents of address register 21. The initial state causes a zero address to be computed by the difference engine by directing to the inputs of the adder 24 through 2:1 multiplexer 25 the ones complement of the matrix difference descriptor 14, and through 2:1 multiplexer 26 the unchanged matrix difference descriptor 14 and a non-zero carry value supplied by the finite state machine 17. For subsequent states multiplexer 25 directs the contents of address register 21 to the adder 24, and multiplexer 26 selects as a function of its control input either matrix difference descriptor 14 or matrix difference descriptor 13. The finite state machine 17 controls both multiplexers 25 and 26 in their various states and provides a zero carry value to the adder 24 in all states other than the initial state. For matrices of higher dimension than two the 2:1 multiplexer 26 is replaced by a multiplexer with a larger number of inputs.

The modulo arithmetic computation unit 22 comprises an adder 27 having as inputs the ones complement of the matrix modulo descriptor 15, the output of the finite difference engine and a logic high carry whose output is the difference between the finite difference engine output address and the matrix modulo descriptor value. The unit 22 further comprises a multiplexer 28 which is controlled by the sign of the adder 27 result to pass either the unchanged output of the finite difference engine 20 or the output of the adder 27 to its output. The output of the multiplexer 28 is supplied to the address register 21 for use in the computation of the next address. The address supplied by the multiplexer is a valid address sequence for the matrix structure.

The address sequence obtained from unit 22 can be adapted for use in a computer system by offsetting the values by a constant which is stored as a matrix base descriptor 16, and which is added to the output of unit 22 in a base adder 23.

The cyclic decrementer 18 comprises a serially arranged configuration of a multiplexer 29, a register 30 and a register decrementer/test-means 31. The finite state machine 17 initialises the decrementer 31 to zero in the initial state and consequently causes the test-means to cause the multiplexer 29 to pass the matrix size descriptor 12 to the register 30. In subsequent states the contents of the register 30 is decremented in register decrementer 31 and tested for the zero value. A non-zero value causes the multiplexer 29 to store the register decrementer output in the register 30. A zero value causes the multiplexer 29 to pass the matrix size descriptor 12 to the register 30. This description is applicable to each of the plurality of counters required for an n-dimensional generator.

| s1 | s0 | run | zf1 | zf2 | rld1 | rld2 | cin | s1 | s0 |
|----|----|----|----|----|----|----|----|----|----|
| 0 | 0 | 0 | x | x | 0 | 0 | 0 | 0 | 0 |
| 0 | 0 | 1 | x | x | 0 | 0 | 1 | 0 | 1 |
| 0 | 1 | x | x | x | 0 | 0 | 0 | 1 | 0 |
| 1 | 0 | x | 0 | 0 | 0 | 0 | 1 | 1 | 0 |
| 1 | 0 | x | 1 | 0 | 1 | 0 | 0 | 1 | 0 |
| 1 | 0 | x | 1 | 1 | 1 | 1 | 0 | 0 | 0 |

TABLE 2: State table for one embodiment of a two-dimensional address generator PLA.

The state table for the address generator is shown in table 2. Variables are:
s0,s1: state address lines
run: start flag
zf1,zf2: zero flags from decrementers
rld1,rld2: reload signals for the decrementers
cin: carry input to first adder.
Equations which describe the outputs are:

$$s0 = cin = \overline{s0.s1}.run$$

$$s1 = s0.\overline{s1} + \overline{s0}.s1.\overline{z1f}.\overline{z2f} + \overline{s0}.s1.z1f.\overline{z2f}$$

$$rld1 = \overline{s0}.s1.z1f.\overline{z2f} + \overline{s0}.s1.z1f.z2f$$

$$rld2 = \overline{s0}.s1.z1f.z2f$$

AREA AND TIME CONSIDERATIONS

It is assumed that in the schematic of FIG. 1, all computations are done in a two-phase clocked system, with the address calculation being performed with combinatorial logic. Further, it is assumed that the circuits are implemented in a CMOS technology and use the simplest possible ripple-carry addition circuits. Using these assumptions there are estimated to be in excess of 5000 transistors in the multiplexer/inversion/addition datapath for a 32-bit implementation, and less than 10000 transistors in the complete generator.

Consider a technology in which the slowest ripple-carry adder has an execution time per bit of 2 ns. The output from the second adder will follow the output from the first by about 5 ns, and will occur about 70 ns after phase 2 is active. This timing determines the start time of the third addition, which requires a further 70 ns including the multiplexer delay. Thus the generator can execute in approximately 200 ns, allowing 50 ns for a phase1 clock cycle. In an embodiment of the invention only about 10 ns would be needed for the phase 1 clock period.

Additional registers can be added to the circuit to reduce the number of adders.

Multiplexer-based Manchester carry circuits can execute at less than 1 ns per bit in current processes. These circuits allow the multiplexing of a single adder to perform the three additions at the expense of some additional registers and control circuitry. Benefits of this approach are that the operands are not required at the same time and so a RAM register-file can be used to minimise the area of the data registers.

If faster address generation is required, the adder architecture can be replaced with faster structures. In this case a trade off, of area for execution time is performed. To achieve maximum performance the mapping generator can be pipelined, and it is estimated that with existing processes it is reasonable to expect addresses to be generated at a rate that exceeds 50 MHz.

The use of number theory mapping hardware implemented as a difference engine provides access to both normal and transposed matrix structures, including constant matrices stored as a single scalar. Circulant matrices are generated from a single row. The generality of the approach makes possible the use of prime factor mappings of dense matrices without time penalty. The prime factor mappings are used to optimise performance when executing algorithms such as convolutions, correlations and a large number of linear transforms. Examples of these transforms include the Fourier transform, the Chirp-z transform and the Hartley transform.

The technique is elegant as the number theory mappings which were originally additional operations are implemented without time penalty. In addition, as the conventional storage schemes for matrices appear as a subset of the mapping capability of the generator, the need for conventional address generation hardware is removed.

MATRIX ADDRESSING EXAMPLES

Arguments which are required by the generator of this embodiment are the set {base, delta1, delta2, n1, n2, q}. The following examples consider 3×5, 5×3 and 5×5 matrices, and show the address sequences which are used for normal, transposed, prime factor mapped and circulant matrices. The examples shown are obtained by executing the simulator provided in FIG. 2.

1. Normal Form

A 3×5 matrix stored in row order requires a simple linear sequence.
  Enter base,delta1,delta2,n1,n2,q
  0 1 1 5 3 15
  0 1 2 3 4 5 6 7 8 9 10 11 12 13 14

A non-zero base address simply offsets the address sequence, e.g.
  Enter base,delta1,delta2,n1,n2,q
  100 1 1 5 3 15
  100 101 102 103 104 105 106 107 108 109 110 111 112 113 114

2. Transposed Form

Transposition of the above matrix requires the following arguments.
  Enter base,delta1,delta2,n1,n2,q
  0 5 -9 3 5 15
  0 5 10 1 6 11 2 7 12 3 8 13 4 9 14

This is a multiple-shuffle of the sequential addresses.

3. Prime factor mappings

A prime factor mapping of the matrix is given by the following:
  Enter base,delta1,delta2,n1,n2,q
  0 3 8 5 3 15
  0 3 6 9 12 5 8 11 14 2 10 13 1 4 7

4. Transposed prime factor mappings

Transposition of the above mapped matrix is obtained by:
  Enter base,delta1,delta2,n1,n2,q
  0 5 8 3 5 15

0 5 10 3 8 13 6 11 1 9 14 4 12 2 7

5. Circulant matrices

For matrices which are circulant, major savings in both storage and generation time are possible by computing only the first row, and generating the required matrix from this one row. As an example the generator is used to generate a 3×5 matrix from a single 5-element array.

Enter base,delta1,delta2,n1,n2,q
0 1 0 5 3 5
0 1 2 3 4 4 0 1 2 3 3 4 0 1 2

This is the technique used to generate the unit matrix I from a single row with a one in the first element position followed by N- 1 zeroes (for an order N matrix).

A skew-circulant matrix is generated similarly:
Enter base,delta1,delta2,n1,n2,q
0 1 2 5 3 5
0 1 2 3 4 1 2 3 4 0 2 3 4 0 1

Constant Matrices

Where an algorithm calls for the multiplication of a matrix by a scalar constant, e.g. C=aA, it is readily implemented by a Hadamard multiplication of the matrix by an identically dimensioned matrix whose elements are the desired constant. This is readily achieved by generating a single scalar and then choosing parameters for the mapping hardware which construct the constant matrix from the one scalar, i.e. for a scalar at address 0:

Enter base,delta1,delta2,n1,n2,q
0 0 0 5 3 1
0 0 0 0 0 0 0 0 0 0 0 0 0 0 0

Sub-matrix generation

Sub-matrices are extracted from an arbitrary matrix with appropriate offsets, e.g. the 2×2 sub-matrix of the matrix in the first example, starting at element $a_{2,2}$.

Enter base,delta1,delta2,n1,n2,q
6 1 4 2 2 15
6 7 11 12

Skewed sub-matrices are extracted similarly.

A MULTI-DIMENSIONAL TRANSFORM EXAMPLE

The T transform is a linear transform which uses as its kernel the real function $cas\theta = cos\theta + sin\theta$ defined by Hartley in 1942. The discrete transform is defined as a matrix vector product. Alternate integer representation mappings can be used to re-write one-dimensional T transforms whose lengths are factorable into co-prime integers as multi-dimensional transforms. These transforms can be implemented as sets of matrix products. The T transform can be used as a faster algorithm for computing both the Hartley and Fourier transforms for real data.

Hartley, in 1942 [1], defined an alternative real kernel for the Fourier integrals which led to the following transform pair discussed in detail in [2]:

$$H(f) = \frac{1}{\sqrt{2\pi}} \int_{-\infty}^{\infty} x(t) cas(2\pi ft) dt \tag{5}$$

$$X(t) = \frac{1}{\sqrt{2\pi}} \int_{-\infty}^{\infty} H(f) cas(2\pi ft) df \tag{6}$$

where $cas(2\pi ft) = cos(2\pi ft) + sin(2\pi ft)$, X(t) is a real function of time, and H(f) is a real function of frequency.

These integrals are the continuous Hartley transforms. For sampled data systems the Discrete Hartley Transform (DHT) pair can be written as $$H(k) = \frac{1}{\sqrt{N}} \sum_{n=0}^{N-1} x(n) cas(2\pi nk/N) \tag{7}$$

$$x(n) = \frac{1}{\sqrt{N}} \sum_{k=0}^{N-1} H(k) cas(2\pi nk/N) \tag{8}$$

Equations (7) and (8) are best considered as matrix-vector products.

When number theory mappings are applied to the matrix-vector products which define the Hartley transform the mappings convert the one-dimensional matrix-vector product, or convolution, to a multi-dimensional convolution which can be implemented as a series of matrix-matrix multiplications. These higher dimensional transforms are not readily expressed in terms of the kernel.

A related transform which is defined expressly in terms of the cas kernel is the T transform. The one-dimensional T-transform is identical to the Hartley transform, and is defined by equation (7).

THE MULTI-DIMENSIONAL PRIME FACTOR T TRANSFORM

Consider the mapping of the linear input and output vectors x(n) and X(k) into p-dimensional forms using the alternate integer representation maps $$n = \left( \sum_{i=1}^{p} \prod_{1 \leq j \leq p, j \neq i} N_j n_i \right)_N \tag{9}$$

$$k = \left( \sum_{i=1}^{p} \prod_{1 \leq j \leq p, j \neq i} N_j k_i \right)_N \tag{10}$$

and the product is given by:

$$nk = \left( \sum_{i=1}^{p} \prod_{1 \leq j \leq p, j \neq i} N_j^2 n_i k_i \right)_N \tag{11}$$

where the length N of the vectors is factorable into p co-prime factors $N_1 \ldots N_p$, and $$N = \prod_{i=1}^{p} N_i.$$

Substitution of this product into the DHT equation (7) converts the one-dimensional Hartley transform into a multi-dimensional transform. However, this multi-dimensional form is not a simple extension Of the cas kernel.

The T multi-dimensional transform is written directly in terms of the kernel, and for the p-dimensional case is written simply as $$T(k_1, k_2, \ldots, k_3) = \frac{1}{N} \sum_{n_1=0}^{N_1-1} \sum_{n_2=0}^{N_2-1} \ldots \sum_{n_p=0}^{N_p-1} x(n_1, n_2, \ldots, n_p) \tag{12}$$

-continued $$cas\left(\frac{2\pi N n_1 k_1}{N_1^2}\right) cas\left(\frac{2\pi N n_2 k_2}{N_2^2}\right) \ldots cas\left(\frac{2\pi N n_p k_p}{N_p^2}\right)$$

The inverse transform is simply $$x(n_1, n_2, \ldots, n_p) = \sum_{n_1=0}^{N_1-1} \sum_{n_2=0}^{N_2-1} \ldots \sum_{n_p=0}^{N_p-1} (k_1, k_2, \ldots, k_p) \quad (13)$$

$$cas\left(\frac{2\pi N n_1 k_1}{N_1^2}\right) cas\left(\frac{2\pi N n_2 k_2}{N_2^2}\right) \ldots cas\left(\frac{2\pi N n_p k_p}{N_p^2}\right)$$

This transform is of interest for the following reasons:
  it is readily computed with a recursive procedure
  filtering can be done in the T domain
  the Hartley transform for 2, 3 and 4 dimensions can be readily derived from it.
  the real Fourier transform for 2, 3 and 4 dimensions is derivable directly from the T transform.

Although Fourier and Hartley transforms of higher dimension than four can be computed with the T transform, it is likely to be less computationally efficient than the direct computation.

The following presents the relationship between the T and Hartley transforms.
The identity $$2\text{cas}(a+b) = \text{cas}(a)\text{cas}(b) + \text{cas}(a)\text{cas}(-b) + \text{cas}(-a)\text{cas}(b) - \text{cas}(-a)\text{cas}(-b) \quad (14)$$

can be used with the two-dimensional T transform to compute the Hartley transform. Let $T(k_1,k_2)$ be the two-dimensional T transform. Then the two-dimensional Hartley transform is given by $$2H(k_1,k_2) = T(k_1,k_2) + T(N_1-k_1,k_2) + T(k_1,N_2-k_2) - T(N_1-k_1,N_2-k_2) \quad (15)$$

For the three-dimensional case, the following identity is used:

$$2\text{cas}(a+b+c) = \text{cas}(-a)\text{cas}(b)\text{cas}(c) + \text{cas}(a)\text{cas}(-b)\text{cas}(c) + \text{cas}(a)\text{cas}(b)\text{cas}(-c) - \text{cas}(-a)\text{cas}(-b)\text{cas}(-c) \quad (16)$$

Let $T(k_1,k_2,k_3)$ be the three-dimensional T transform. Then the three-dimensional Hartley transform is given by $$2H(k_1,k_2,k_3) = T(N_1-k_1,k_2,k_3) + T(k_1,N_2-k_2,k_3) + T(k_1,k_2,N_3-k_3) - T(N_1-k_1,N_2-k_2,N_3-k_3) \quad (17)$$

Example code for the computation of the p-dimensional T-transform is given in Table 4. Additional code which generates the Hartley transform from a two-dimensional T-transform is given in Table 5. The T-transform is computed directly with two matrix products in this example to minimise overheads. For higher dimensional factorizations than two, the generalised algorithm would be used, and a tensor_add_real function used to implement the sums as required.

```
#include <stdio.h>
include <math.h> void pla(clock,s0,s1,run,n1z,n2z,rldn1,rldn2,cin)
int clock,*s0,*s1,run,*n1z,*n2z,*rldn1,*rldn2,*cin;
{
    static int t0,t1,t2,t3,t4;
    if (clock == 0) {
        t0 = (~*s0 & ~*s1 & run)&1;
        t1 = (*s0 & ~*s1)&1;
        t2 = (~*s0 & *s1 & ~*n1z & ~*n2z)&1;
        t3 = (~*s0 & *s1 & *n1z & ~*n2z)&1;
        t4 = (~*s0 & *s1 & *n1z & *n2z)&1;
    }
    else {
        *s0 = t0;
        *s1 = t1|t2|t3;
        *rldn2 = t4;
        *rldn1 = t3|t4;
        *cin = *s0;
    }
} void dec(reg,zf)
int *reg,*zf;
{
```

```
    *zf = (--(*reg)==0);
/*  printf("reg,zf = %3d %3d\n",*reg,*zf);  */
} void print_states(clock,s1,s0,run,zf1,zf2,rldn1,rldn2,carryin)
int clock,s1,s0,run,zf1,zf2,rldn1,rldn2,carryin;
{
    if (clock==1){
      printf("s1,s0,run,zf1,zf2,rldn1,rldn2,carryin");
      printf("%2d %2d %2d %2d %2d %2d %2d %2d\n",
        s1,s0,run,zf1,zf2,rldn1,rldn2,carryin);
        }
} int mux(sel,a,b)
int sel,a,b;
{
    if (sel==0) return(a);

else return(b);
} int add(a,b,c)
int a,b,c;
{
    return(a+b+c);
} void main()
{
   int clock,s0,s1,run,rldn1,rldn2,carryin;
   int n1, n2, q, reg1, reg2, zf1, zf2;
   int add_reg_p1, add_reg_p2, delta1, delta2, base;
   int mux0, mux1, mux2, add0, add1, add2;

run = 1; s0 = 0; s1 = 0; rldn1 = 0; rldn2 = 0; carryin=0; zf1 = 0; zf2 = 0;

printf("Enter base,delta1,delta2,n1,n2,q\n");
   scanf("%d %d %d %d %d %d\n",&base,&delta1,&delta2,&n1,&n2,&q);
   printf("%d %d %d %d %d %d\n",base,delta1,delta2,n1,n2,q);
   reg1 = n1; reg2 = n2;

while (/*run+s0+s1*/zf1+zf2 !=2){
   for (clock=0;clock<2;clock++) {

/* register operations - reload decrement registers if zero */
     if (clock==0) {
        if (zf1==1) reg1=n1;
        if (zf2==1) reg2=n2;
        add_reg_p1 = ~mux2;
```

```
            }
        if (clock==1) {
            dec(®1,&zf1);
            if (zf1==1) dec(®2,&zf2);
            add_reg_p2 = ~add_reg_p1;
        }

/* reset run flag */
        if (s0==1) run = 0;

/* generate control signals */
        pla(clock,&s0,&s1,run,&zf1,&zf2,&rldn1,&rldn2,&carryin);

/* Phase2 operations */
        if (clock==1) {
            mux0 = mux(s0,add_reg_p2,~delta1);
            mux1 = mux(rldn1,delta1,delta2);
            add0 = add(mux0,mux1,carryin);
            add1 = add(add0,~q,1);
            mux2 = mux(add1<0,add1,add0);
            add2 = add(base,mux2,0);
            printf("%d ",add2);
            if (zf1==1) printf(" ");
        }
/*      print_states(clock,s1,s0,run,zf1,zf2,rldn1,rldn2,carryin); */
        }
    }
    printf("\n");
}
```

TABLE 4

FIGURE 3: 'C' code which implements the generalised T-transform
```
#include <stdio.h>
include <math.h>

/*#define TIME */
define SIM typedef float precision;

typedef struct {
int init; /* initial offset */
int n1; /* no. of cols */
int n2; /* no. of rows */
int d1; /* row element spacing */
int d2; /* last row element to first next-row element */
int modulo;  /* modulo */
int negate;
precision * body; /* data pointer */
} MATRIX;
```

```
typedef struct {
int p, *n, *N;
MATRIX **W;
} cas_nd_coef;

#define ex 5
#define f_co 0
#define f_si 1
#define f_ha 2
#define f_ha_ 3
define addr 4 void put(A,i,j,x)
MATRIX *A; int i,j; precision x;
{
  int address;
  address = A->init+(i*((A->n1-1)*A->d1+A->d2)+j*A->d1);
  if (A->modulo) address = address%A->modulo;
  A->body[address] = x;
}

MATRIX * init_hart(func, n1, n)
int func, n1, n;
{
  int i, j, k; precision arg;
  MATRIX *x;
  x = define_matrix((precision *) 0,0,1,1,n,n,n*n,0);
  for(i=0; i<n; i++){
    for(j=0; j<n; j++){
      arg = 2.0*M_PI*(n1*i*j%n)/n;
      k = i==j;
      switch (func){
      case f_co:
put(x,i,j,cos(arg));
break;
      case f_si:
put(x,i,j,sin(arg));
break;
      case f_ha:
put(x,i,j,cos(arg)+sin(arg));
break;
      case f_ha_:
put(x,i,j,cos(-arg)+sin(-arg));
break;
      case addr:
put(x,i,j,(precision) i*x->n1+j);
break;
      case I:
put(x,i,j,(precision) k);
break;
      }
```

```
      }
    }
    return x;
} cas_nd_coef * pfnd_cas_coef(p,n)
int p, *n;
{
  cas_nd_coef *A;
  int i,N;

A = (cas_nd_coef *) malloc(sizeof(cas_nd_coef));
  A->W = (MATRIX **) malloc(p*sizeof(MATRIX));
  A->n = (int *) malloc(p*sizeof(int));
  A->N = (int *) malloc(p*sizeof(int));
  A->p = p;
  N = 1;
  for (i=0;i<p;i++) N *= n[i];
  for(i=0;i<p;i++){
    A->n[i] = n[i];
    A->N[i] = N/n[i];
    A->W[i] = (MATRIX *) malloc(sizeof(MATRIX));
    A->W[i] = init_hart(f_ha,A->N[i],n[i]);
  }
  return A;
} void map(A,offset,N1,N2)
MATRIX *A; int offset, N1, N2;
{
  A->init = offset;
  A->d1 = N1;
  A->d2 = N2 - (A->n1 - 1)*N1;
}

MATRIX * Pfmap(A, offset, N1, N2)
MATRIX *A; int offset, N1, N2;
{
  map(A, offset, N1, N2);
  return A;
} void Tensor_Multiply_real(level,p,init,A,X)
int level, p, init;
cas_nd_coef *A;
MATRIX **X;
{
  int i,l,index,P,P_1,P_2,*n,*N;

P = A->p;
    P_1 = A->p-1;
```

```
      P_2 = A->p-2;
      if (level < P_2) {
         index = (level+p)%P;
         for (i=0; i<A->n[index]; i++) {
if (i) init += A->N[index];
Tensor_Multiply_real(level+1,p,init,A,X);
         }
      }
      else {
         n = A->n; N = A->N;
         init = init % (N[0]*n[0]);
         X[1]->n2=X[1]->n2 = X[0]->n2 = X[0]->n2 = n[(P_2+p)%P];
         X[1]->n1=X[1]->n1 = X[0]->n1 = X[0]->n1 = n[(P_1+p)%P];
         if(!init) {
   X[p&1] = Pfmap(X[p&1],init, N[(P_1+p)%P], N[(P_2+p)%P]);
   X[(1+p)&1] = Pfmap(X[(1+p)&1],init,N[(P_1+p)%P],N[(P_2+p)%P]);
}
         else
X[0]->init=X[0]->init=X[1]->init=X[1]->init=init;
         X[(1+p)&1]=mmult3(A->W[(P_2+p)%P],X[p&1],X[(p+1)&1]);
      }
} precision *
pfcas_nd(A, x)
    cas_nd_coef    *A;
    precision      *x;
{
    MATRIX     *X[2];
    precision  *y;
    int p,NN;

NN = A->n[0]*A->N[0];

/* Define temporary storage matrices */
    X[0] = define_matrix(x,0,1,1,A->n[0],A->n[1],NN,0);
    X[1] = define_matrix((precision *) 0,0,1,1,A->n[0],A->n[1],NN,0);

/* Perform the p-dimensional T transform */
    for (p=0; p<A->p; p++)
       Tensor_Multiply_real(0,p,0,A,X);

/* Assign the result vector */
    y = X[A->p%2]->body;

/* Free the temporary storage and return the transform */
    free(X[(A->p+1)%2]->body);
    free(X[0]);
    free(X[1]);
```

```
/* Return the transform */
    return(y);
}
```

TABLE 5

FIGURE 4: 'C' code which generates a Hartley transform from a T transform.

```
MATRIX * mod_index_rev(x,u,v)
MATRIX *x; int u,v;
/* This function maps a matrix T(u,v) to the matrix T((N-u) % N,(M-v) %
M)
as a function of the input arguments u and v. If u or v is true (false),
the index is mapped (unmapped). True is 1 and false is 0.
*/

{
  MATRIX *A;

if (!(A = (MATRIX *) malloc(sizeof(MATRIX))))
  printf(
      "Memory allocation for MATRIX struct failed in define_matrix\n");
  A->init = x->init;
  A->n1 = x->n1;
  A->n2 = x->n2;
  switch (2*v+u) {
  case(0): A->d1 = x->d1;
    A->d2 = x->d2;
    break;
  case(1): A->d1 = x->d1;
    A->d2 = (x->d1*(x->n1-1)+x->d2)*(x->n2-1)-A->d1*(x->n1-1);
    break;
  case(2): A->d1 = x->d1*(x->n1-1);
    A->d2 = A->d1+x->d2-A->d1*(x->n1-1);
    break;
  case(3): A->d1 = x->d1*(x->n1-1);
    A->d2 = (x->d1*(x->n1-1)+x->d2)*(x->n2-1)-A->d1*(x->n1-1);
    break;
  }
  A->modulo = x->modulo;
  A->negate = x->negate;
  A->body = x->body;
  return A;
} precision * pfcascas0(A,x)
cas_coef *A; precision *x;
{
  MATRIX *a, *T, *c;
  precision *y;
  int n1, n2, i;
  MATRIX *T10, *T01, *T11, *t;
```

```
/* Initialise matrix dimensions using the coefficient matrix dimensions
*/
  n1 = A->ha->n1; n2 = A->ha_->n1;

/* Define some temporary storage matrices */
  a = define_matrix(x,0,1,1,n2,n1,n1*n2,0);
  T = define_matrix((precision *) 0,0,1,1,n2,n1,n1*n2,0);

/* Perform the T transform */
  T = (mmult3(mmult2(A->ha,Pfmap(a,0,n1,n2)),A->ha_,Pfmap(T,0,n1,n2)));

y = T->body;

for (i=0;i<n1*n2;i++) y[i] = y[i]/sqrt((precision) n1*n2)/2.0;

T10 = mod_index_rev(T,1,0);
  T01 = mod_index_rev(T,0,1);
  T11 = mod_index_rev(T,1,1);

/* Generate the Hartley matrix from the T matrix */
  t = madd2(T10,T01);
  msub3(t,T11,t);
  madd3(T,t,T);

/* Free the temporary storage and return the transform */
  Free_Matrix(t);
  Free_Matrix(c);
  free((char *) T);
  free((char *) a);
  free((char *) T10);
  free((char *) T01);
  free((char *) T11);
  return y;
}
```

The claims defining the invention are as follows:

1. An address generator to generate at its output, output addresses of elements of an N-dimensional matrix comprising
   storage means for storing at least four descriptors representative of a matrix structure, wherein,
   at least two size descriptors representative of the size of two dimensions of an N-dimensional matrix and
   at least a further two of said descriptors are difference descriptors representative of the values of two finite address differences,
   a counter means per size descriptor,
   a sequential N-dimensional finite difference calculation means having as inputs said difference descriptors and an initially zero, previously calculated output address from the address generator whereby one of said counter means controls the finite difference used by the calculation means to calculate a calculation means output address which is also the address generator output address of an element of said N-dimensional matrix.

2. An address generator according to claim 1 wherein said storage means also stores a modulo descriptor representative of an address value which is greater than all matrix element addresses,
   subtraction means for subtraction from said calculation means output address said modulo descriptor to produce a modulo subtraction means result and a subtraction means sign output,
   selection means to select as the output of said address generator either of the calculation means output address or the subtraction means output address according to the subtraction means sign output.

3. An address generator according to claim 2 wherein said selection means selects as the output of said address generator said calculation means output address if said subtraction means sign output is negative or said subtraction means output address if said subtraction means sign output is positive.

4. An address generator according to claim 3 further comprising
   a base descriptor representative of an offset value,
   an addition means to add said base descriptor to said selection means output to provide an offset address as the address gererator output address of said element of said N-dimensional matrix.

5. An address generator according to claim 1 wherein each or said counter means further comprises:
   a selection means having first, second and at least one control input, said first input being one of said at least two size descriptors, a counter storage means adapted to receive and store a current counter value input from said selection means, a decrementer means adapted to receive and decrement a current counter value from said counter storage means and to output the decremented counter value to said selection means second input, a test means to test said decrementer means output for a zero value and to output a signal to a first of said at least one control input of said selection means which is representative of the true or false result of the test, whereby, a true result of said test controls said selection means to pass said one of said at least two size descriptions size descriptor from said selection means first input to said counter storage means, and, a false result of said test controls said selection means to pass from said selection means second input said decrementer means output to said counter storage means.

6. An address generator according to claim 5 wherein each said counter means per size descriptor controls a subsequent counter to operate only when the test means signal of its controlling counter is representative of a true result.

7. An address generator according to claim 6, further comprising:

a finite difference control signal generator, having at least two inputs, each input adapted to receive said test means signal from a respective one of said counter means, for generating at least one control signal to select which of said at least two difference descriptors are input to said finite difference calculation means.

* * * * *

UNITED STATES PATENT AND TRADEMARK OFFICE
CERTIFICATE OF CORRECTION

PATENT NO. : 5,398,322
DATED : March 14, 1995
INVENTOR(S) : WARREN MARWOOD

It is certified that error appears in the above-indentified patent and that said Letters Patent is hereby corrected as shown below:

- COLUMN 25, CLAIM 5, LINE 14, DELETE "DESCRIPTIONS";
  LINE 15, DELETE "SIZE DESCRIPTOR" AND REPLACE WITH
  --DESCRIPTORS--.

Signed and Sealed this

Twenty-third Day of May, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,398,322
DATED : MARCH 14, 1995
INVENTOR(S) : WARREN MARWOOD

It is certified that error appears in the above-indentified patent and that said Letters Patent is hereby corrected as shown below:

On the title page, item [73] should read:
LUMINIS PTY. LTD., ADELAIDE, AUSTRALIA

AND

COMMONWEALTH OF AUSTRALIA, CANBERRA, AUSTRALIA

Signed and Sealed this

Third Day of September, 1996

Attest:

BRUCE LEHMAN

Attesting Officer      Commissioner of Patents and Trademarks